US006369339B1

(12) United States Patent
Noord

(10) Patent No.: US 6,369,339 B1
(45) Date of Patent: Apr. 9, 2002

(54) APPARATUS FOR MANIPULATING A LOAD

(76) Inventor: Jan Noord, Asserstraat 115A, 9492 TA, Ubbena (NL)

(*) Notice: Subject to any disclaimer, the term of this patent is extended or adjusted under 35 U.S.C. 154(b) by 0 days.

(21) Appl. No.: 09/513,632

(22) Filed: Feb. 28, 2000

(30) Foreign Application Priority Data

Oct. 18, 1999 (NL) ............................................ 1013326

(51) Int. Cl.[7] ........................ G01G 19/14; F16D 31/02; E21B 47/00

(52) U.S. Cl. ....................... 177/147; 177/208; 177/254; 60/413; 60/421; 60/431; 73/152.01

(58) Field of Search ............................. 177/25.11, 147, 177/208, 209, 212, 254; 60/413, 419, 421, 429, 430, 431; 73/152.48, 152.49, 152.51, 152.59, 152.01

(56) References Cited

U.S. PATENT DOCUMENTS

| | | | | | |
|---|---|---|---|---|---|
| 2,945,677 | A | * | 7/1960 | Kammerer, Jr. | 60/431 |
| 3,323,606 | A | * | 6/1967 | Burns et al. | 177/147 |
| 3,411,349 | A | * | 11/1968 | Smith et al. | 177/208 |
| 3,443,380 | A | * | 5/1969 | Karazija | 60/421 |
| 4,651,838 | A | * | 3/1987 | Hamilton et al. | 177/209 |
| 4,779,690 | A | * | 10/1988 | Woodman | 177/208 |
| 4,875,530 | A | | 10/1989 | Frink et al. | 175/27 |
| 4,917,198 | A | * | 4/1990 | Sing | 177/208 |
| 5,065,829 | A | * | 11/1991 | Smith | 177/141 |
| 5,119,895 | A | * | 6/1992 | Gradert | 177/208 |
| 5,139,101 | A | * | 8/1992 | Smith | 177/208 |
| 5,343,003 | A | * | 8/1994 | Jamieson et al. | 177/132 |
| 5,345,042 | A | * | 9/1994 | Jamieson | 177/165 |
| 5,474,142 | A | | 12/1995 | Bowden | 175/27 |

FOREIGN PATENT DOCUMENTS

| | | | |
|---|---|---|---|
| GB | 2 273 278 | 6/1994 | B66D/1/48 |

* cited by examiner

*Primary Examiner*—Randy W. Gibson
(74) *Attorney, Agent, or Firm*—Mark Zovko

(57) ABSTRACT

The invention relates to an apparatus for manipulating in the height and in particular setting down of a load. The apparatus comprises a suspension on a lifting device, which suspension comprises a drive, with which drive the load can be manipulated in the height; a weighing device with which the weight of the load can be determined; a memory connected to the weighing device for storing an initial weight of the load; and comparing means for comparing an actual weight with the initial weight stored in the memory for the purpose of selective energizing of the drive in response to the comparison.

17 Claims, 3 Drawing Sheets

APPARATUS FOR MANIPULATING A LOAD

The present invention relates to an apparatus for manipulating in the height and in particular setting down of a load. The invention relates particularly, though not exclusively, to an apparatus for placing or setting down an element which is heavy but highly susceptible to damage, such as a coupling tube in a tube column, wherein after drilling to a depth corresponding with the length of the coupling tube a new coupling tube is added to the drill column. This is the case for instance in the extraction of oil and natural gas.

The screw thread connections with sealing surfaces between separate coupling tubes in the tube column are very susceptible to damage when a coupling tube is lowered with too great a force onto the already formed tube column. A damaged coupling tube, or of which at least the screw thread connection, which is often a conical screw thread connection, or a sealing surface is damaged, is written off and cannot be used. Such coupling tubes often weight 600 kg, although their weight varies considerably from tube to tube.

Apparatuses are known in the art for height manipulation of such loads. These known apparatuses have the drawback that they need precise information in advance concerning the actual weight of a load for manipulating before manipulation of this load can take place. The changing or in any case adjusting of a setting is required for this purpose. If this is not done, the load may be set down with too great a force and suffer damage.

The known apparatuses also have other drawbacks in addition to this above described lack of sensitivity. The weight of a load for manipulating is often very great, particularly in relation to the desired sensitivity during manipulation and in particular during setting down of the load. For this relation between great weight and fine sensitivity no solution has yet been found in the known art.

The present invention has for its object to obviate or at least mitigate the problems and shortcoming of the known apparatuses, for which purpose an apparatus according to the present invention is distinguished by a suspension on a lifting device, which suspension comprises a drive, with which drive the load can be manipulated in the height; a weighing device with which the weight of the load can be determined; a linear hydraulic accumulator serving as a "memory" connected to the weighing device for storing an initial weight of the load; comparing means for comparing an actual weight with the initial weight stored in the memory for the purpose of selective energizing of the drive in response to the comparison.

An apparatus according to the invention is capable of manipulating heavy loads very delicately and has no problems, within the operational range of course, with the variation in weight of the individual loads for manipulating.

In one embodiment the weighing device comprises a hydraulic weighing cylinder and the hydraulic accumulator is at least approximately linear in a range of operating pressures. A fully mechanical/hydraulic operation of the weighing cylinder and the accumulator is thus achieved without precise determination of the actual weight of the load, but in the form of pressure storage as a reference value corresponding to this weight.

It is noted that in such an embodiment the hydraulic accumulator can very advantageously be designed as a hydraulic hose of a determined length, because this will behave, depending on the chosen length thereof, the chosen or used type of hose, in linear manner in said range of operating pressure, or will do so at least approximately.

In order to ensure a "memory" operation of the hydraulic accumulator, i.e. the entrapped pressure serving as a reference value, a closing valve can be arranged in an embodiment of the invention in a line between the weighing cylinder and the hydraulic accumulator. The closing valve is opened in order to determine the initial value, wherein an open connection is effected be between the weighing cylinder, the line and the hydraulic accumulator, whereafter the closing valve can be closed. The hydraulic accumulator now retains the initial pressure value as "memory" which can thus be used for comparison with weights of the load actually borne by the weighing cylinder.

In another embodiment of the invention the comparing means can be formed by a control valve connected on one side to the weighing device and on the other to the memory. In the latterly described embodiment of a weighing cylinder as hydraulic design for the weighing device and a hydraulic accumulator as design for the memory, the actuators of the control valve can be hydraulic and directly connected to respectively the weighing cylinder and the accumulator. A very simple and reliable mechanical/hydraulic configuration is hereby also obtained. The above stated closing valve can herein be arranged in parallel over the control valve in the line between the weighing cylinder and the accumulator.

In the above stated embodiment with hydraulic actuators of a control valve etc., the control valve can comprise a control piston enclosed on both sides between flexible membranes in a control cylinder, and the actuators can be open connections to respectively the weighing cylinder and the accumulator which act on the membranes, wherein the drive can be energized subject to pressure differences over the control valve and connections for opening herein. In the configuration of the control valve with membranes which enclose the actual control valve in flexible manner, very controlled movements of the control valve in the control cylinder are possible without the very abrupt connection transitions usual in the known art. So-called "overshoot" problems are hereby prevented and a very controlled operation of the drive is realized.

A further embodiment has the feature that the accumulator is adapted to retain therein a weight decreased by a predetermined quantity. A downward movement caused by the drive is hereby ensured, independently of a separate crude movement mechanism which can remain limited to the function of movement over large distances, wherein the drive according to the invention takes over displacement. In an embodiment with a hydraulic weighing cylinder and a hydraulic accumulator, a pressure amplifier can be connected to the accumulator. The desired decrease in the weight to be retained as a reference can then be adjusted therewith, thereby serving as a memory feature. The predetermined quantity by which the weight is to be decreased preferably corresponds to a desired and/or allowable contact force during moving or setting down of the load. Herein the desired or allowable contact force is with certainty not exceeded.

Further embodiments are defined in the dependent claims and comprise a hybrid system of hydraulics and pneumatics, a drive designed as double-action hydraulic cylinder connected to at least one hydraulic source of medium under pressure or the like, etc.

The invention will be further elucidated hereinbelow on the basis of an embodiment thereof and with reference to the annexed drawing, in which.

Figure 1:
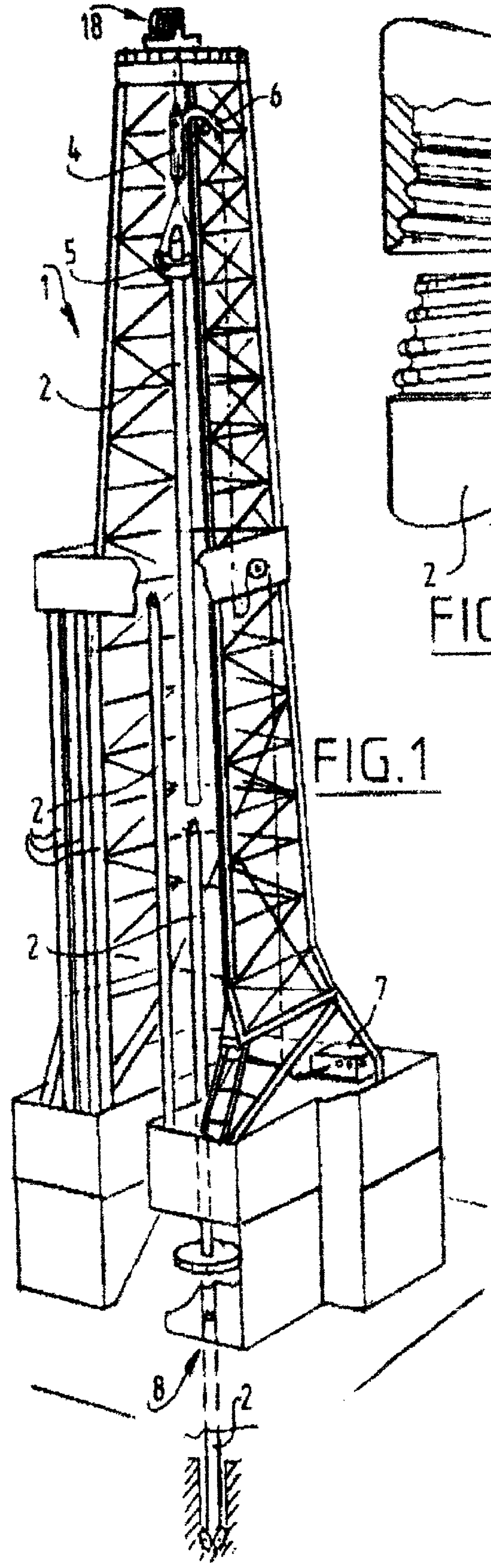
FIG. 1 shows a partly cut-away perspective view of a drilling tower with an apparatus according to the present invention.

FIG. 1 shows a drilling tower 1 in which an apparatus 10 according to the present invention is arranged. The drilling tower serves for assembly of a tube column 8 consisting of coupling tubes 2 which are provided in the manner shown in FIG. 2 with a conical screw thread for mutual connection thereof.

The drilling tower comprises a coupling 5 for engaging individual coupling tubes 2, wherein coupling 5 hangs from a suspension 4 which forms an explicit component of the present apparatus according to the invention. Suspension 4 comprises in the manner shown in FIG. 3 a weighing device in the form of a weighing cylinder 9 and a drive in the form of a double-action hydraulic cylinder 11. Weighing cylinder 9 and double-action cylinder 11 are connected by means of a line bundle to a housing 7 for other components of apparatus 10, which is shown substantially in its entirety, albeit schematically, in FIG. 4. Safety cable 12 in FIG. 3 is intended to prevent a hazardous situation occurring, for instance in the case hydraulic pressure should fall away unexpectedly or in the case of other failure wherein coupling 5, possibly with a coupling tube 2 thereon, comes to hang on safety cable 12 instead of on suspension 4.

Figure 3:
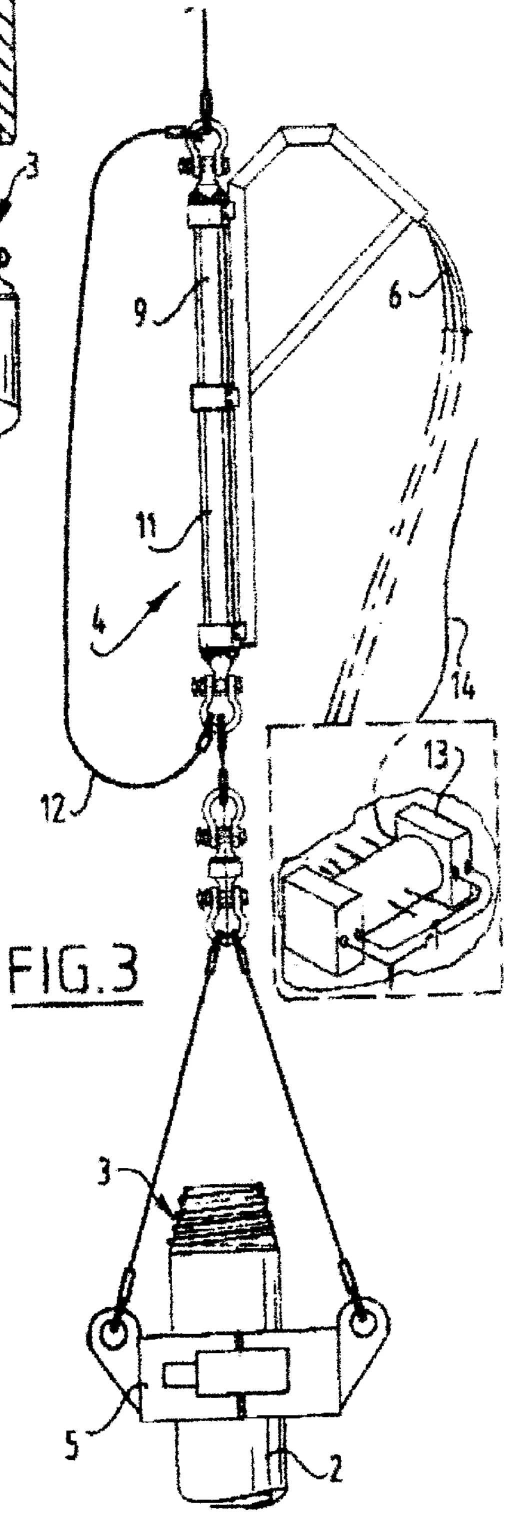
FIG. 3 is a schematic view of a part of an apparatus according to the present invention.
Figure 4:
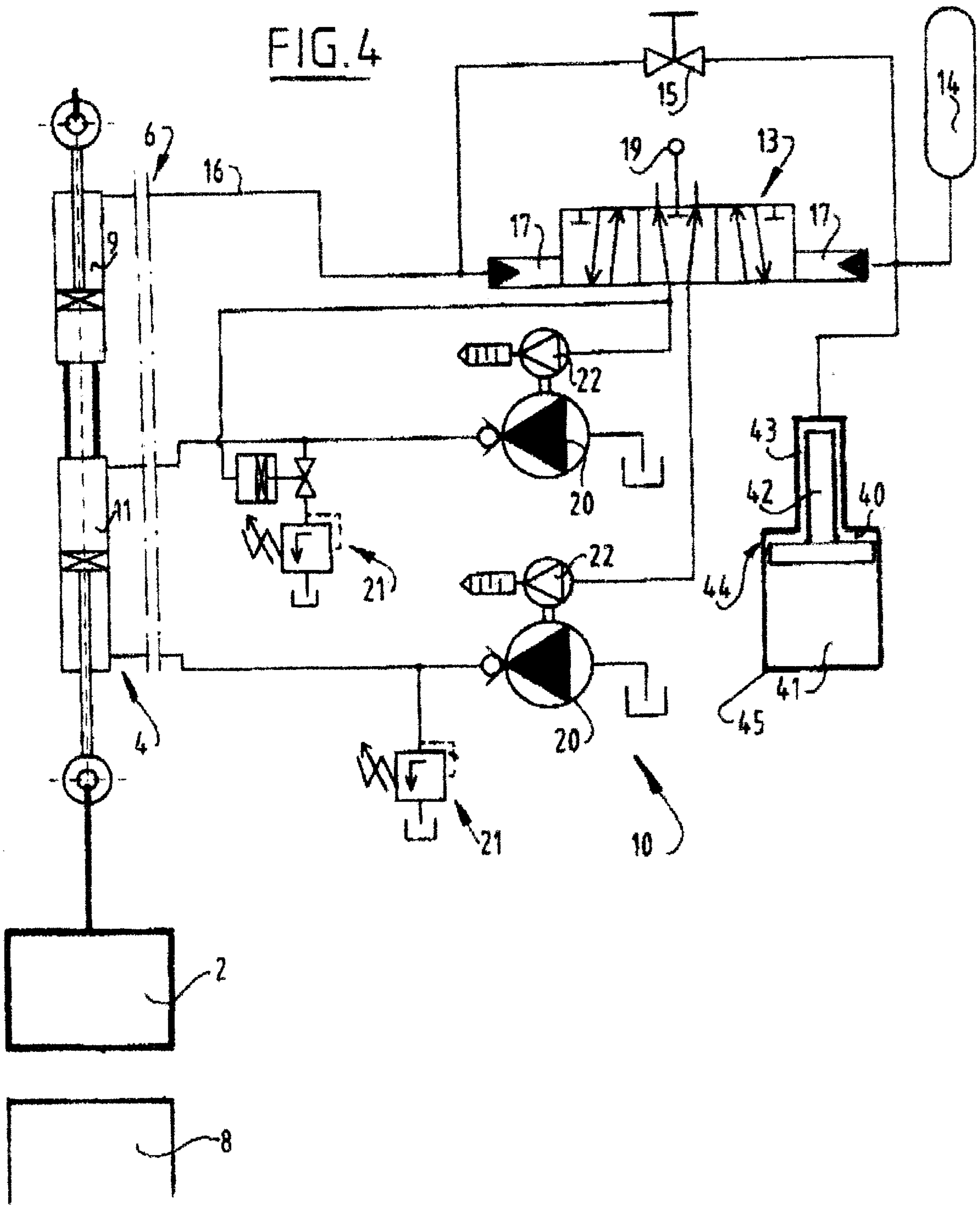
FIG. 4 is a schematic view of substantially a whole apparatus according to the present invention.
Figure 5:
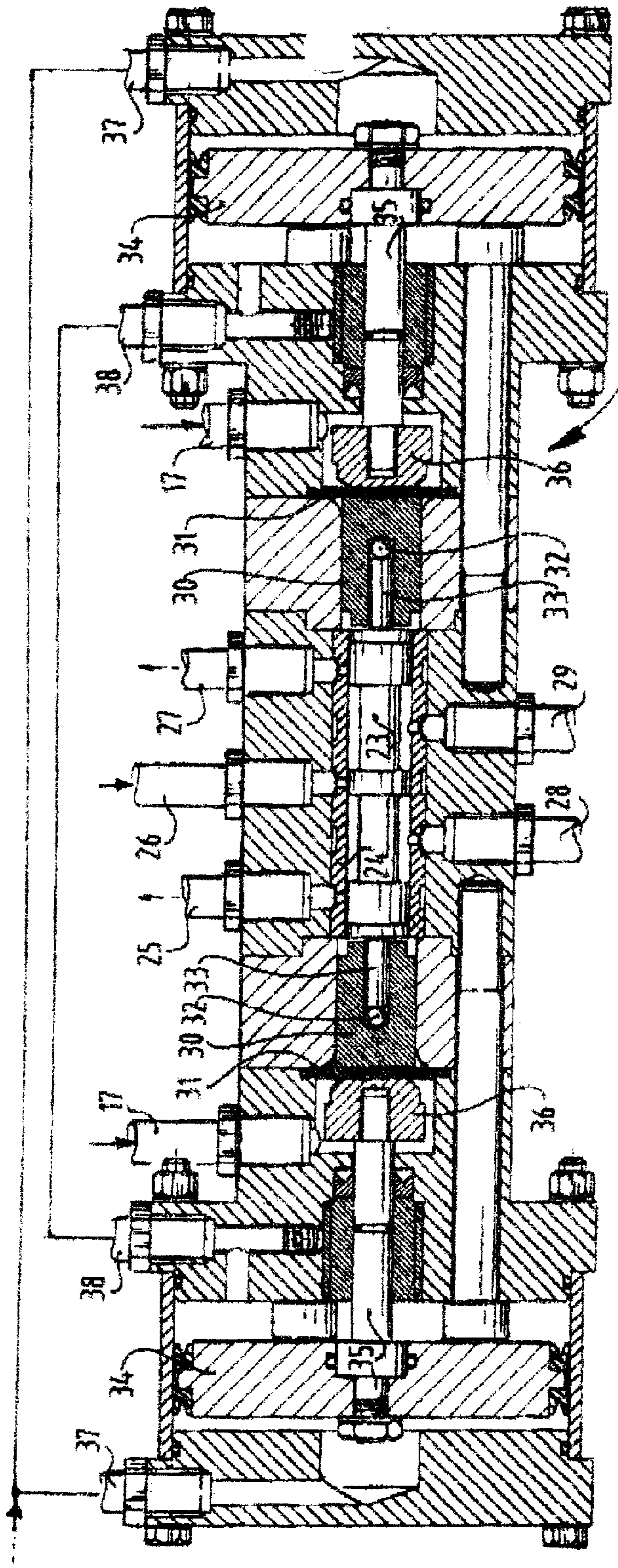
FIG. 5 shows a view in cross-section of a component of the apparatus shown in FIG. 4.
Figure 6:
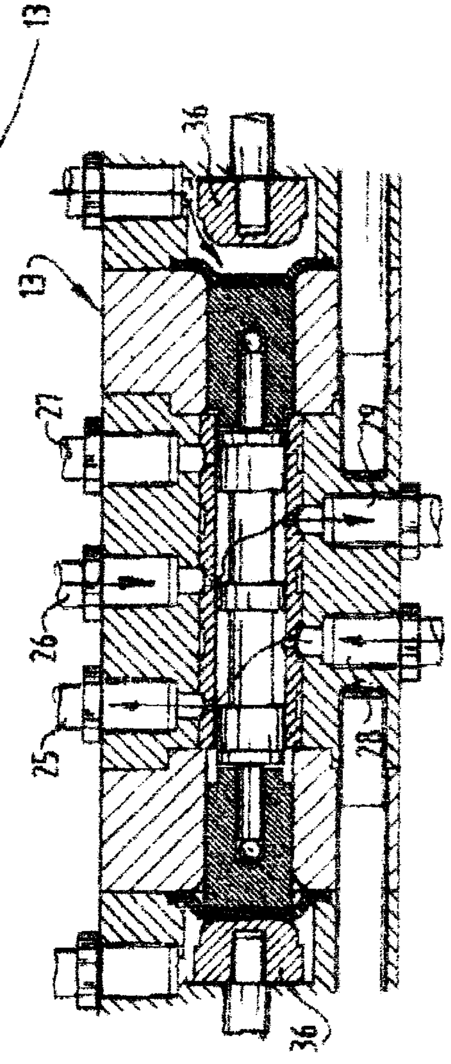
FIG. 6 shows a detail of the component of FIG. 5 in a first operational situation thereof.

Line bundle 6 runs from suspension 4 to housing 7, in which is arranged a control valve 13 as shown schematically in FIG. 3 and in FIG. 4. FIG. 5 and 6 are representations of an actual embodiment of such a control side 13, the operation and function of which will be further explained below with reference to these figures.

Figure 2:
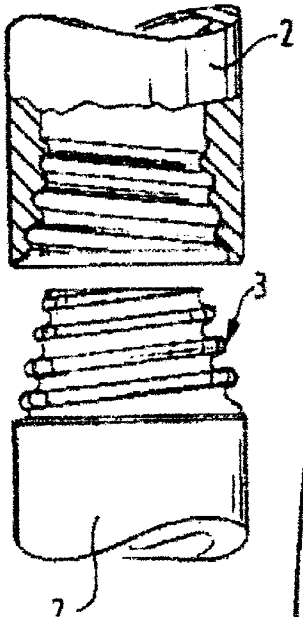
FIG. 2 shows a detail of the manner in which coupling tubes are mutually connected in the drilling tower of FIG. 1 to form a tube column.

During the realizing of a connection between individual coupling tubes 2 so as to form the tube column 8 in the manner shown schematically in FIG. 2, the conical screw threads 3 of the individual coupling tubes 2 have to be protected against damage. The slightest damage to the upper coupling tube 2 in FIG. 2 is already fatal and will result in this coupling tube 2 being written off; it can no longer be used to construct tube column 8. Even worse still is when the lower of the coupling tubes 2 in FIG. 2 is damaged on the conical screw thread 3 thereof; the whole tube column 8 formed up to that point must then be lifted upward in order to remove the lower coupling tube in FIG. 2, or the upper coupling tube in FIG. 1, from tube column 8. Decisive here is the force with which upper coupling tube 2 is lowered onto lower coupling tube 1 in FIG. 2. This force preferably corresponds with a weight of no more than roughly 25–30 kg. The apparatus to be further described hereinbelow is adapted for this purpose, wherein it makes no difference how heavy the individual coupling tubes 2 are and even variations in the weight of individual coupling tubes 2 are irrelevant.

It is noted that the above mentioned control valve 13, which is shown schematically in FIG. 3 as detail of the total apparatus 10, is a design of comparing means for comparing an actual weight to an initial weight stored in a memory (to be further described hereinbelow) for the purpose of selective energizing of the drive, which in FIG. 4 is a double-action hydraulic cylinder 11, in response to the comparison.

The apparatus 10 according to the present invention shown schematically in FIG. 4 comprises in addition to suspension 4 a linear hydraulic accumulator 14 as memory which can be connected selectively to weighing cylinder 9 via closing valve 15. In the opened situation of closing valve 15 an initial weight of the coupling tube 2 forming a load is determine, although in the embodiment shown here not as an exact value. The weight of the load on weighing cylinder 9 results in a pressure in the chamber of this weighing cylinder 9 corresponding to the weight of the load. Because closing valve 15 is herein open, this pressure likewise prevails in the line 16 between weighing cylinder 9 and linear hydraulic accumulator 14 as well as in this linear hydraulic accumulator. This takes place immediately after a load is picked up or just before it is set down again, i.e. in the embodiment of FIG. 1 before coupling tubes 2 are assembled in the manner shown in FIG. 2 to form tube column 8. After this determination of the initial weight of coupling tube 2 the closing valve 15 is closed. The closing value 15 serves to "trap" a reference pressure in the accumulator which reference pressure acts as a memory.

The control valve 13, which comprises hydraulic actuators 17 located mutually opposite in the shift direction, which actuators 17 are in open connection with respectively the chamber of weighing cylinder 9 and linear hydraulic accumulator 14, is then subjected to the same pressure from each of the actuators 17. Immediately after closing of closing valve 15 both actuators 17 are subject to the same pressure, whereby control valve 13, which can occupy substantially three positions, remains in a starting position as shown in FIG. 4.

It is noted that the drilling tower 1 shown in FIG. 1 comprises its own displacement mechanism 18 which serves to carry a coupling tube 2 for arranging on tube column 8 into the vicinity of the tube column 8 already formed up to that point. Displacement mechanism 18 is herein rendered inoperative and the double-action hydraulic cylinder 11 in suspension 4 takes over the function of displacing the coupling tube 2 for arranging. The distance between the load in the form of coupling tube 2 and the destination of this load in the form of tube column 8 at which this transition takes place depends on the operating stroke of double-action hydraulic cylinder 11 forming the drive of apparatus 10.

It is also noted that linear accumulator 14 of FIG. 4 is designed in FIG. 3 as a hydraulic hose, also designated with reference numeral 14. Such a hydraulic hose has an at least approximately linear characteristic in the range of operating pressures and is thus suitable for use as at least approximately linear accumulator. Other linear hydraulic accumulators can also be envisaged, but the embodiment of a hose is elegant and simple and takes up hardly any space, since it can advantageously be laid along the line bundle 6 which is required anyway.

Using control valve 13 one or no connection is made selectively between a source 19 of medium (air or hydraulic fluid) under pressure and one of two pumps 20, which are each connected to one side of the double-action hydraulic cylinder 11 which forms the drive for movement of the load in the form of coupling tube 2 in the direction away from or toward the already formed tube column 8, in any case the latter part of this relative movement. In the intermediate position of control valve 13 shown in FIG. 4, no connection has been realized between source 19 and pumps 20. The drive in the form of double-action cylinder 11 is thus not energized, which corresponds with equal pressures on both actuators 17 and indicates that the actual weight measured at a determined moment by weighing cylinder 9 is still equal to the initially measured weight of load 2. This intermediate position can also be forced, irrespective of the prevailing pressures, using an immobilizing means further described hereinbelow with reference to FIG. 5 and 6.

Once load 2 has been carried with displacement mechanism 18 into the proximity of its destination, displacement mechanism 18 is rendered inoperative, whereafter operation of the drive 11 of the embodiment of the invention begins. Prior thereto the pressure prevailing in linear accumulator 14 is reduced by a value with a pressure amplifier 44, this value corresponding with an allowable and safe contact force between coupling tubes 2 and the already formed tube column 8. The initial weight determination, closing of closing valve 15 and decrease of the pressure in linear accumulator 14 can take place respectively immediately after pick-up, whereafter the displacement mechanism 18 is set into operation while an above mentioned immobilizing means is energized. Alternatively, the pressure in the linear accumulator can be decreased with pressure amplifier 44 only at the place of destination, and even the initial determination can take place there.

After closing of closing valve 15 the pressure in linear accumulator 14 is reduced in the following manner. The pressure amplifier comprises a cylinder 45 with a plunger-piston combination 42 therein, control connections 40, 41 and a single-stroke pump head 43. By energizing control connection 40 and de-energizing control connection 41 from the situation shown in FIG. 4 a predetermined-quantity of fluid or oil corresponding with the stroke of plunger 42 is extracted from accumulator 14, this being accompanied by a pressure decrease in the accumulator. In a released state of the immobilizing means referred to above and further described below, the control valve is then subjected to a higher pressure on the actuator 17 connected to the weighing cylinder. As a consequence the control valve 13 shifts to the right from the position shown in FIG. 4 and the upper of the pumps 20 in FIG. 4 is energized for a downward movement of cylinder 11, and therewith the load 2.

The downward movement of cylinder 11, and therewith load 2, comes to an end when coupling tube 2 comes to rest on the already formed tube column 8. With a continuing movement of cylinder 11 the weight with which coupling tube 2 rests on tube column 8 increases and the weight borne by weighing cylinder 9 thus decreases. When the pressure associated with this decrease in weight borne by weighing cylinder 9 has decreased by practically the same value as the pressure decrease on the side of linear accumulator 14 caused by pressure amplifier 44, the situation shown in FIG. 4 is restored and the control valve re-assumes the position shown here, whereafter the driving by cylinder 11 is stopped.

When the load in the form of coupling tube 2 comes into contact with tube column 8, the weight borne by weighing cylinder 9 decreases. As a result the pressure balance over control valve 13 is restored, whereby the control valve re-assumes the position shown in FIG. 4. By properly selecting the pressure decrease to be brought about in the accumulator by pressure amplifier 44, for instance on the basis of the quantity of fluid (oil) to be extracted from accumulator 14 by pressure amplifier 44 by controlling the stroke volume of pressure amplifier 44, the pressure decrease associated with the contact force of coupling tube 2 on tube column 8, wherein the movement is stopped, can be readily determined in advance.

If no use is being made of pressure amplifier 44 and valve 15 closes, as soon as load 2 hangs still and is then pulled on, the weight borne by weighing cylinder 9 becomes greater and the pressure therein increases, together with the pressure on the left-hand actuator 17 of control valve 13, whereby control valve 13 in FIG. 4 will (again) shift to the right. The upper of the pumps 20 is hereby set into operation to energize the drive in the form of double-action cylinder 11 in the direction of a downward displacement of load 2. When the load is moved downward in helical movement by the drilling tower crew, the drive 11 assists herein. For the intended connection to a tube column 8 the crew need exert hardly any force and the drive helps the crew in bringing about a positioning of coupling tube 2 which is in any case correct in height relative to tube column 8 in the coupling helical movement.

Conversely, it is the case that if the crew pushes the coupling tube upward, the weight borne by weighing cylinder 9 decreases, the control valve 13 shifts to the left and the lower of the pumps 20 in FIG. 4 is set into operation. Under the influence of the pressure exerted by this pump 20 the cylinder 11 will retract and carry coupling tube 2 upward.

In the influencing of the drive in this manner a threshold force associated with the design of the apparatus must however be overcome, although the cylinder (to be further described below) of control valve 13 preferably exhibits as little friction as possible so as to avoid the phenomenon of stick-slip.

In FIG. 4 overflows in the form of sequencing valves 21 are arranged between pumps 20 and the drive in the form of double-action cylinder 11. In the shown configuration this prevents a so-called overshoot occurring at a transition between movement and standstill of cylinder 11.

The upper of the sequencing valves 21 shown in FIG. 4, which co-acts with upper pump 20 to energize the drive in downward direction, can be set to 50 bar for this purpose, while the lower sequencing valve 21 associated with upward movement of the drive in the form of cylinder 11 can be set to 210 bar.

The load 2 on suspension 4 also causes a pressure in the moving cylinder 11 in the lower chamber thereof. When control valve 13 takes up a position shifted to the right relative to FIG. 4, a valve 39 closes in a connection between the sequencing valve 21 functioning as overflow and the upper pump 20, and this pump 20 comes into operation. The pressure rises until it is sufficient in the lower part of the chamber of cylinder 11 to cause opening (e.g. at 210 bar) of the sequencing valve 21 associated with lower pump 20 and also functioning as overflow. Only then does the cylinder begin the downward movement, this without stick-slip. Once coupling tube 2 has come to rest with a desired contact force on tube column 8 in the above described manner and control valve 13 returns to the starting position thereof shown in FIG. 4, the upper pump 20 stops and valve 39 is opened. The load 2 is pulled up slightly by the pressure then prevailing in the lower part of the chamber of cylinder 11, whereafter a balance also prevails once again in the upper part and the lower part of the chamber of cylinder 11. This raising is sufficient to compensate for the inertia of the system 10 and the inertia of load 2 and thereby preventing overshoot. The sequencing valve 21 associated with upper pump 20 and functioning as overflow has the function of damping this latterly described process.

Adjustment of the overflow pressure at the sequencing valves 21 takes place by adjusting the spring force of the sequencing valves.

It is noted that in the embodiment shown in FIG. 4 the control valve 13 is connected to a pneumatic source 19. When control valve 13 is in a position wherein one of the pumps 20 is set into operation, a converter 22 is arranged in each case as control for the relevant one of the pumps 20.

It is further noted that for energizing of the drive in the form of double-action cylinder 11 in upward or downward direction a hydraulic or pneumatic circuit (not shown) is additionally provided, which operates directly on the desired pump 20 or once again via converters 22, for instance to induce an up and/or downward displacement of load 2 on drive 11 irrespective of the set and possibly decreased initial weight and/or the actual weight. Processing of the additional circuit for direct influencing of the operation of drive 11 in the diagram of FIG. 4 is well within the competence and reach of the average skilled person, certainly after study of the foregoing, so that further description thereof is omitted.

FIG. 5 shows in sectional view an embodiment of a control valve 13 and FIG. 6 shows a view of this control valve 13 in a shifted position thereof.

Control valve 13 comprises in FIG. 5 a valve 23 shiftable in practically frictionless manner in cylinder 24 to which five connections 25–29 are connected. Connection 26 leads to source 19, while connections 25 and 27 lead to a reservoir or simply a discharge. Connections 28 and 29 are on the other hand connected to pumps 20 in FIG. 4. Due to the form of the piston or valve 23 in cylinder 24, in the position thereof shown in FIG. 5 there is no connection between connections 25–27 and connections 28 and 29. If on the other hand piston or valve 23 shifts to the right, a connection is brought about from source 19 via connection 26 along valve 23 and via connection 28 to the upper of the pumps 20 in FIG. 4. The reverse situation is shown in FIG. 6, where valve 23 is displaced to the left under the influence of a higher pressure on the right-hand side corresponding with linear hydraulic accumulator 14. The lower of the pumps 20 is set into operation to energize drive 11 in upward direction.

Valve 23 is enclosed in the line of cylinder 24 between auxiliary pistons 30 which, due to an assembly of a centering ball 32 and a pin 33, exert a centering action on valve 23 to prevent jamming thereof.

On the side of the auxiliary pistons 30 opposite valve 23 are arranged membranes 31. These latter are made of flexible material. On the side of membranes 31 opposite auxiliary pistons 30 there prevail pressures such as are supplied to actuators 17. Membranes 31 have a very favourable effect on the displacement characteristics of valve 23. Valve 23 progresses through gradual and even movements and does not, as a known valve, shoot from the one extreme position thereof to the other. The membranes also form a very effective medium separation, wherein the medium supplied via actuators 17 remains absolutely separated from the medium used to bring about selective connections between connection 26 in particular and connections 28 and 29.

The threshold force described with reference to FIG. 4 which must be overcome by a member of the crew of drilling tower 1 during manual manipulation of the coupling tube to cause the apparatus according to the invention to follow and to assist or enhance this manipulation is caused partly by the elasticity and resilience of membrane 31. Other factors are the active surface of weighing cylinder 9 which itself preferably exhibits the smallest possible resistance associated with friction, the active surface of auxiliary pistons 30, the volumetric expansion value of the at least approximately linear accumulator 14, and measures in apparatus 10 associated with suppressing or preventing "stick-slip", etc. These are therefore design parameters in which the average skilled person will be proficient without any inventive work, particularly after studying the foregoing, for instance by varying the parameters such as the flexibility of the used membranes, the length of the hose 14 applied as accumulator etc.

Control valve 13 further comprises an immobilizing means. This is formed by immobilizing pistons 34 which are disposed outwardly relative to valve 23 on the side of the membranes 31 opposite thereto. Immobilizing pistons 34 are connected to a piston rod 35 which are each provided with a head 36 with which the active region of membranes 31 can be covered. By introducing medium under pressure via connections 37 the immobilizing means is energized and valve 23 is efficiently enclosed in stationary manner in the starting position thereof shown in FIG. 5. The immobilizing means can be rendered inoperative by removing the pressure from connections 37 and/or by introducing a (higher) pressure via connections 38. In the released situation of the immobilizing means the heads 36 on immobilizing pistons 34 are detached from membranes 31 but form a stop for bounding the outward movement of valve 23, as shown in FIG. 6.

The present invention is described by way of example in the foregoing, but is not limited thereto. The invention is defined in the appended claims. Within the thereby defined scope of protection many alternative embodiments are possible which will occur to the skilled person after examination of the foregoing. A hybrid system of a pneumatic and a hydraulic circuit does not therefore have to be used, but the whole apparatus as shown in FIG. 4 can have a hydraulic design. It is even possible for drives and weighing devices to be used other than hydraulic ones. Even an electric motor can thus be used as drive with a load cell for the weighing device, wherein not the actual weight determined by the load cell but only a precise determination of the initial weight in relation to the weight at a later moment is important.

What is claimed is:

1. Apparatus for manipulating in the height and in particular setting down of a load, which apparatus is hydraulically controlled and comprises:

- a suspension on a lifting device, which suspension comprises a drive, with which drive the load can be manipulated in the height;
- a weighing device with which the weight of the load can be determined;
- a memory connected to the weighing device for storing an initial weight of the load;
- comparing means for comparing an actual weight with the initial weight stored in the memory for the purpose of selective energizing of the drive in response to the comparison.

2. Apparatus as claimed in claim 1, wherein the weighing device comprises a hydraulic weighing cylinder and the memory comprises a hydraulic accumulator which is at least approximately linear in a range of operating pressures.

3. Apparatus as claimed in claim 2, wherein the hydraulic accumulator comprises a flexible line such as a hydraulic hose.

4. Apparatus as claimed in claim 2, wherein the comparing means comprise a controllable closing valve which is arranged in a line between the weighing cylinder and the accumulator and which is opened during determining of the initial value and is closed during the comparing.

5. Apparatus as claimed in claim 1, wherein the comparing means comprise a control valve having on one side a first actuator connected to the weighing device and on the other a second actuator connected to the memory, and the actuators are arranged opposite each other on the control valve in the shift direction of the control valve.

6. Apparatus as claimed in claim 2, wherein the actuators of the control valve are hydraulic and directly connected to respectively the weighing cylinder and the accumulator.

7. Apparatus as claimed in claim 4, wherein the closing valve is arranged in parallel over the control valve in the line between the weighing cylinder and the accumulator.

8. Apparatus as claimed in claim 6, wherein the control valve comprises a control piston enclosed on both sides between flexible membranes in a control cylinder, and the actuators comprise open connections to respectively the weighing cylinder and the accumulator which act on the membranes, wherein the drive can be energized subject to pressure differences over the control valve and connections for opening herein.

9. Apparatus as claimed in claim 8, wherein the connection for opening comprises a line to a control connected to the drive.

10. Apparatus as claimed in claim 9, wherein the line for opening and the control are pneumatic.

11. Apparatus as claimed in claim 1, wherein the drive comprises a double-action hydraulic cylinder with at least one source of medium under pressure for connecting selectively to at least one of the connections of the cylinder associated with a direction of movement.

12. Apparatus as claimed in claim 11, wherein the source of medium under pressure is controllable and is connected to the comparing means.

13. Apparatus as claimed in claim 11, wherein between the source of medium under pressure and the double-action cylinder a sequencing valve is arranged as overflow.

14. Apparatus as claimed in claim 1 wherein the comparing means comprise a control valve which is energized at least during the displacement of the load by the lifting device.

15. Apparatus as claimed in claim 1, wherein the memory is adapted to retain therein a weight decreased by a predetermined quantity.

16. Apparatus as claimed in claim 2, wherein the memory comprises a pressure amplifier connected to the accumulator.

17. Apparatus as claimed in claim 15, wherein the predetermined quantity by which the weight is to be decreased corresponds to an allowable contact force during moving or setting down of the load.

* * * * *